Figure 4:
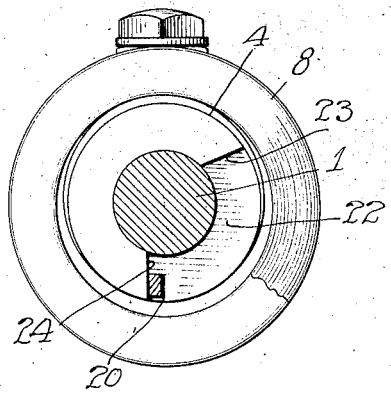

Nov. 2, 1926.
W. L. McGRATH
1,605,128
CLUTCH MECHANISM FOR ENGINE STARTERS
Filed May 5, 1919     2 Sheets-Sheet 1
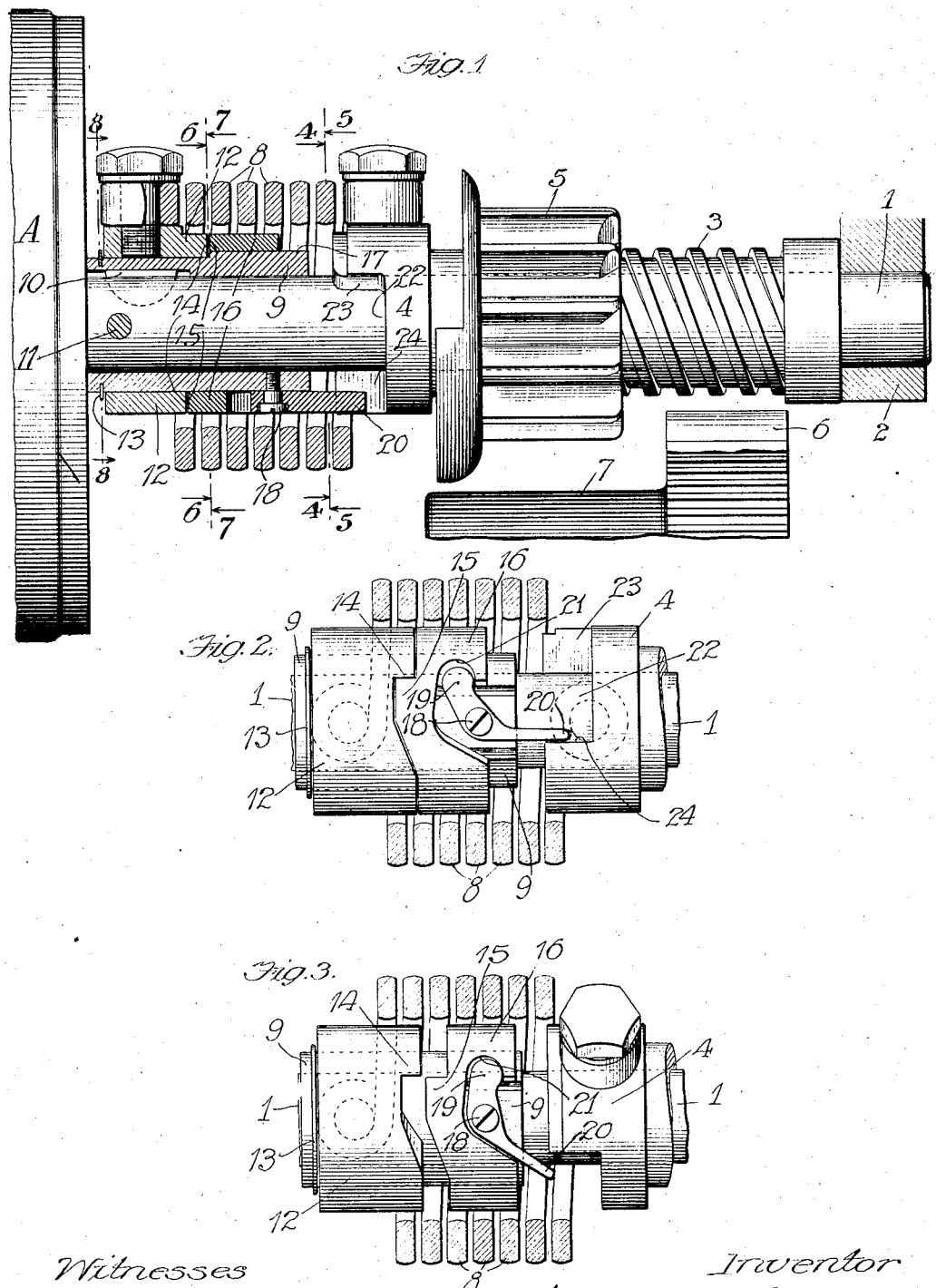
Witnesses
Martin H. Olsen
Robert Dobberman
Inventor
William L. McGrath
By Rector, Hibben, Davis & Macauley
His Attys Nov. 2, 1926.

W. L. McGRATH 1,605,128

CLUTCH MECHANISM FOR ENGINE STARTERS

Filed May 5, 1919        2 Sheets-Sheet 2

Witnesses
Martin H. Olsen
Robert Dobberman

Inventor
William L. McGrath
By Reeter Hibben Davis & Macauley
His Att'ys

Patented Nov. 2, 1926.

1,605,128

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

CLUTCH MECHANISM FOR ENGINE STARTERS.

Application filed May 5, 1919. Serial No. 294,789.

My invention relates to an apparatus for starting an engine, more particularly an internal combustion engine and the object thereof is to provide a simple, efficient and reliable apparatus particularly designed to take care of any load condition beyond a predetermined maximum (such as results from the back fire of the engine) which is liable to be injurious or destructive to the starting apparatus or to the engine part with which it is connected. My invention concerns more particularly the drive or transmission portion of the apparatus and is embodied therein.

While my invention is not limited in its application and use to any particular construction of starting apparatus or any particular form of drive I have incorporated the same in a well known make of drive, substantially as exemplified by Bendix Patent No. 1,125,935, dated January 26, 1915, and the same will therefore be described in connection therewith. Speaking in general terms this drive includes a rotatable member such as a screw shaft and a pinion threaded thereon and adapted to be automatically advanced into mesh with an engine driven member such as the fly wheel, by the rotation of the screw shaft. This screw shaft is driven either directly or indirectly by a starting motor such as an electric motor and the drive is transmitted through a drive spring located between the screw shaft and a driving head on the driving shaft such as the extended armature shaft or a countershaft driven therefrom.

When a back fire takes place with the driving member or pinion of the drive in mesh with the fly wheel and the motor being operated, the result is that the sudden reversal in direction of rotation of the fly wheel causes a tremendous strain on the drive or transmission and also upon the gear teeth of the fly wheel, owing to the opposition of the two forces, that is, the force or torque from the engine and the force or torque of the electric motor. To take care of this condition and to thereby relieve the parts from this strain I provide in the line of torque or transmission of power a positive driving clutch and an automatic means for controlling the same by causing a disengagement or disabling of the clutch when a certain predetermined load is exceeded and then a re-engagement of the clutch when normal condition is resumed. In the present instance this clutch is included as a part of the driving head structure on the driving shaft and the automatic means is controlled by the degree of relative movement between this driving head and the screw shaft, with the result that when this degree is exceeded the clutch will be automatically declutched or disabled and the driving connection between the starting motor and the screw shaft will thereupon be broken and the pinion may be rotated by the fly wheel in reverse direction without any injury to the drive or starting motor.

Figure 5:
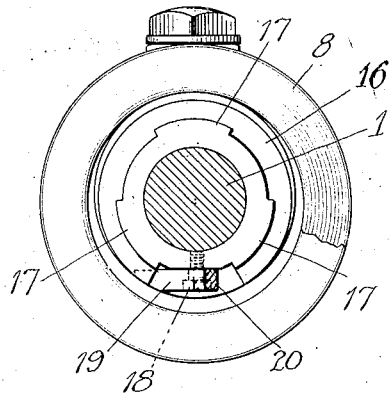
Figure 6:
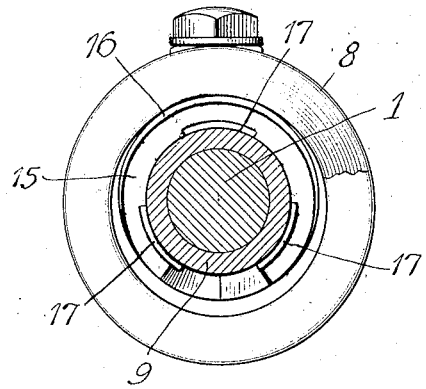
Figure 7:
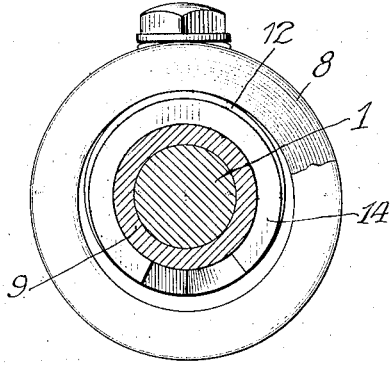
Figure 8:
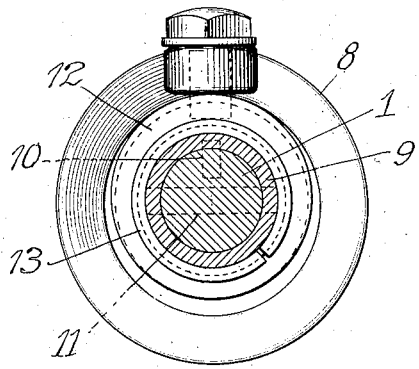

In the drawings Fig. 1 is a sectional elevation of a starting apparatus embodying my invention; Fig. 2 a bottom plan view (with the lower portion of the spring coils removed) showing the clutch closed; Fig. 3 a similar view showing the clutch open or disabled; and Figs. 4, 5, 6, 7 and 8 cross-sections on the correspondingly numbered section lines of Fig. 1.

Referring to the particular embodiment of my invention as herein shown, the drive is here directly driven inasmuch as the driving shaft 1 is the extended armature shaft of an electric motor indicated at A. Moreover the particular drive shown is of the out board type inasmuch as the outer end of the driving shaft has a bearing 2 and the driving member or pinion moves outwardly away from the motor when going into mesh with the fly wheel. It will be understood, however, that my invention is equally applicable to a drive of the well-known inboard type.

Upon the driving shaft there is mounted the screw shaft 3 of the hollow type and having one end, which is here the inner end, somewhat enlarged to form a driving portion 4. Upon the screw thread there is threaded the driving member which is here the pinion 5, adapted to mesh with the teeth 6 of the fly wheel 7 of the engine.

Upon the inner end of the driving shaft there is mounted a driving head which is constructed differently from the usual driving head of said well-known make of drive inasmuch as it includes a positive driving clutch. The entire structure will for convenience be considered a driving head which is operatively connected to the screw shaft through the usual drive spring 8 and adapted to transmit the torque of the starting motor thereto except when the clutch is disabled or disengaged as hereinafter explained.

The driving head consists of a sleeve 9 fitted upon the driving shaft and secured thereto in suitable manner as by means of the key 10 and the pin 11. Upon this sleeve there is loosely mounted a collar 12 held in place against movement to the left by a spring ring 13. This collar constitutes one member of a positive driving clutch by reason of the provision on its outer edge of a clutch jaw 14 which is adapted to engage with a corresponding clutch jaw 15 of the other clutch member 16. This latter clutch member is likewise in the form of a collar and the same is mounted on the sleeve 9 for rotary movement therewith and longitudinal movement independently thereof, by reason of being splined thereon by the spline indicated at 17.

Normally the clutch jaws 14 and 15 are in engagement as shown in Fig. 2 with the result that the torque of the starting motor is transmitted to the screw shaft through the sleeve 9, collars 16 and 12 and the spring 8 but the clutch is adapted to be disabled by the automatic means now to be described. A lever in the form of a bell crank is pivoted by the stud 18 onto the sleeve 9, one end or arm 19 of the bell crank being adapted to to cooperate with the collar 16, and the other arm 20 with the driving portion 4 of the screw shaft. As shown in Figs. 2 and 3 the arm 19 engages a recess 21 in the collar 16 so that when the bell crank is oscillated in a clockwise direction such collar will be moved axially or longitudinally of its sleeve and away from the other collar 12, whereupon the clutch jaws will be disengaged and the clutch will be disabled. The other arm 20 projects outwardly within the recess 22 formed in the driving portion 4 by cutting away a part thereof, the ends of the recess being shoulders 23 and 24. When the drive is not under any load the arm 20 is positioned adjacent the shoulder 24 but in the event of the extreme condition represented by excessive overload the driving head structure and the screw shaft move angularly with respect to each other, that is, the relative angular relationship of these parts is changed whereupon the arm 20 is contacted by the shoulder 23 and the bell crank thereby moved in a clockwise direction so as to instantly disable the clutch, whereupon the starting motor and the driving shaft are disengaged from the drive or transmission in respect to driving action. The force or torque transmitted from the fly wheel due to back fire, for instance, is no longer opposed and the remaining portions of the drive thereupon rotate idly and without any danger of breakage or injury. As soon as the load drops to zero owing to the disabling of the clutch, the parts of the drive will resume their normal position particularly the clutch which will now become re-engaged inasmuch as the angular relationship between the driving head and the screw shaft will be restored by the drive spring 8, whereupon the shoulder 24 will contact the arm 20 and move the clutch member 16 so that the jaw 15 is re-engaged with the jaw 14.

This construction takes care of any load condition beyond a predetermined maximum. In the present instance wherein a torsion spring is used, this predetermination is made by the allowed angular deflection of that spring.

Besides the back fire condition with the pinion then in mesh with the flywheel, as above explained, the construction is adapted to take care of other backfire conditions, as for instance that resulting from the operation of the system during the time of backfire. In this event, the pinion will mesh with the flywheel but the drive and other parts will be relieved of the resulting overload condition. Also the construction takes care of the overload condition resulting from the use of a battery of a voltage higher than that for which the installation is intended. To these ends, the clutch is so constructed and arranged as to be disabled in case of a load exceeding a predetermined maximum in either the forward or backward direction of rotation of the driving or the driven members.

I claim:

1. A drive including a shaft and driving and driven members mounted thereon, one of such members including a positive driving clutch comprising two engaging sleeves, one of which is movable longitudinally on the shaft for engagement with and disengagement from the other sleeve and adapted to re-engage said sleeve when said members resume normal driving position, said members having a relative angular movement, one with respect to the other in the driving operation, and automatic means for disabling such clutch when said angular movement reaches a predetermined degree.

2. A drive including driving and driven members, one of which includes a positive driving clutch, said members having a relative angular movement one with respect to the other in the driving operation and remaining in operative relationship with each other during all of their normal relative angular movements, and automatic means for disabling such clutch operable only when said angular movement reaches a predetermined degree and for thereafter reengaging such clutch.

3. A drive including a shaft and driving and driven members mounted thereon, one of such members including a positive driving clutch comprising two engaging sleeves, one of which is movable longitudinally on the shaft for engagement with and disengagement from the other sleeve and adapted to reengage such sleeve when said members resume normal driving position, said members having a relative angular movement, one with respect to the other in the driving operation, and automatic means controlled by the load for disabling such clutch by moving one of the sleeves longitudinally.

4. A drive including a shaft, and driving and driven members mounted thereon, a positive driving clutch, a yielding driving connection which cooperates with said clutch and through which the normal torque is transmitted, and automatic means for disabling such clutch and thereby relieving said connection from abnormal torque, said clutch comprising two engaging sleeves, one of which is drivingly secured against rotation on the shaft and movable longitudinally thereon for engagement with and disengagement from the other sleeve, and adapted to re-engage such other sleeve when said members resume normal driving position.

5. A drive including driving and driven members, one of which includes a positive driving clutch, said members having a relative angular movement one with respect to the other in the driving operation and remaining in operative relationship with each other during all of their normal relative angular movements, a yielding driving connection which cooperates with and forms the torque transmitting means between said driving and driven members, and automatic means for disabling such clutch only when said angular movement reaches a predetermined degree.

6. A drive including a shaft, and driving and driven members mounted thereon, a positive driving clutch, and automatic means responsive only to the maximum torque for disabling such clutch in the forward driving operation, said clutch comprising two engaging sleeves, one of which is movable longitudinally on the shaft for engagement with and disengagement from the other sleeve, said clutch sleeves remaining in engagement with each other during all of their normal relative angular movements.

7. A drive comprising driving and driven members, and a resilient driving connection, which drivingly connects said members and through which the normal torque is transmitted, said driving member being formed of two sleeves with cooperating positive clutch jaws, one of the sleeves being longitudinally movable for engagement with and disengagement from the other sleeve, and automatic means for disabling said clutch, said means being controlled by overload in the forward driving operation and by reverse or backward driving from the driven member, and said longitudinally movable sleeve being adapted to re-engage the other sleeve when said members resume normal driving position.

8. A transmission or drive including a torsion drive spring, a driving clutch cooperating therewith, and automatic means which is adapted to disable the clutch and whose operation is dependent upon the amount of deflection of the spring and occurs only when a predetermined amount of deflection is reached.

9. A drive comprising driving and driven members, and a resilient driving connection which drivingly connects said members and through which the normal torque is transmitted, said driving member being formed as two sleeves with cooperating positive clutch jaws, one of the sleeves being longitudinally movable for engagement with and disengagement from the other sleeve, said resilient connection providing for relative angular movements of said members, one with respect to the other, and automatic means for disabling said clutch, said means being controlled by the relative degree of angular movement of such members for disabling the clutch in the forward driving operation, and said clutch being automatically disengaged by the reverse or backward driving from the driven member, and said longitudinally movable sleeve being adapted to re-engage the other sleeve when said members resume normal driving position.

10. A transmission or drive including a driving member, a driven member, means including a positive clutch for operatively connecting such members, and means cooperating with such clutch and driven member and arranged to disengage the clutch in the forward driving operation and operable only when the angular displacement of the two members exceeds a predetermined degree and to re-engage the same when such members resume normal position.

11. A transmission or drive comprising a driven shaft, driving means therefor consisting of a driving head including a rotatable sleeve, two driving collars mounted thereon and forming the two normally engaged members of a clutch, one being mounted loosely on the sleeve and the other for rotary movement therewith, and automatic means for controlling the engagement and re-engagement of the clutch.

12. A transmission or drive comprising a driven shaft, driving means therefor consisting of a driving head including a rotatable sleeve, two driving collars mounted thereon and forming the two members of a clutch, one being mounted loosely on the sleeve and the other for rotary movement therewith, and automatic means mounted on the sleeve and actuated by said shaft for controlling the engagement and re-engagement of the clutch.

13. A transmission or drive comprising a driven shaft, driving means therefor consisting of a driving head including a rotatable sleeve, two driving collars mounted thereon and forming the two members of a clutch, one being mounted loosely on the sleeve and the other for rotary movement therewith, and a lever pivoted on the sleeve and cooperating with the shaft and sleeve for controlling the engagement and re-engagement of the clutch.

14. A transmission or drive comprising a driven shaft, driving means therefor consisting of a driving head including a rotatable sleeve, two driving collars mounted thereon and forming the two members of a clutch, one being mounted loosely on the sleeve and the other for rotary movement therewith, and means actuated by the shaft for disabling the clutch.

15. A transmission or drive comprising a driven shaft, driving means therefor consisting of a driving head including a rotatable sleeve, two driving collars mounted thereon and forming the two members of a clutch, one being mounted loosely on the sleeve and the other for rotary movement therewith, and a member mounted on the sleeve and cooperating with the shaft and sleeve for controlling the engagement of the clutch.

16. A transmission or drive comprising a driven shaft, driving means therefor consisting of a driving head including a rotatable sleeve, two driving collars mounted thereon and forming the two members of a clutch, one being mounted loosely on the sleeve and the other for rotary movement therewith, and a bell crank mounted on the sleeve with one arm in cooperation with one of said clutch members and the other in cooperation with the shaft.

17. A transmission or drive comprising a driven shaft, driving means therefor consisting of a driving head including a rotatable sleeve, two driving collars mounted thereon and forming the two members of a clutch, one being mounted loosely on the sleeve and the other for rotary movement therewith, one of said clutch members having a recess and the shaft having a recess, and a bell crank mounted on the sleeve with its two arms projecting into said recesses and actuated by such parts.

18. A transmission or drive comprising a driven shaft, driving means therefor consisting of a driving head including a rotatable sleeve, two driving collars mounted thereon in axial alinement and having complementary clutch jaws on their adjacent edges, one of the collars being mounted loosely on the sleeve and the other for rotary movement therewith and longitudinal movement thereof into and out of clutching engagement with the first collar, and automatic means for moving one of the clutch collars longitudinally to disable the clutch.

19. A transmission or drive comprising a driven shaft, driving means therefor consisting of a driving head including a rotatable sleeve, two driving collars mounted thereon in axial alinement and having complementary clutch jaws on their adjacent edges, one of the collars being mounted loosely on the sleeve and the other for rotary movement therewith and longitudinal movement thereof into and out of clutching engagement with the first collar, and automatic means for moving one of the clutch collars longitudinally to disable the clutch such means comprising a lever pivoted on the sleeve and cooperating with the shaft and sleeve for controlling the engagement of the clutch.

20. A transmission or drive comprising a driven shaft, driving means therefor consisting of a driving head including a rotatable sleeve, two driving collars mounted thereon in axial alinement and having complementary clutch jaws on their adjacent edges, one of the collars being mounted loosely on the sleeve and the other for rotary movement therewith and longitudinal movement thereof into and out of clutching engagement with the first collar, a spring driving connection between the first mentioned collar and the shaft, and automatic means for moving the second mentioned collar longitudinally to disable the clutch.

21. A transmission or drive comprising a driven shaft, driving means therefor consisting of a driving head including a rotatable sleeve, two driving collars mounted thereon in axial alinement and having complementary clutch jaws on their adjacent edges, one of the collars being mounted loosely on the sleeve and the other for rotary movement therewith and longitudinal movement thereof into and out of clutch engagement with the first collar, a coiled driving spring having one end connected to the first mentioned collar and the other end to the shaft, and automatic means for moving the second mentioned collar longitudinally to disable the clutch.

22. A drive including a shaft and driving and driven members, one of which includes a positive driving clutch comprising two engaging sleeves, one of which is movable longitudinally on the shaft for engagement with and disengagement from the other sleeve, said members having a relative angular movement one with respect to the other in the driving operation, and such automatic means including a trigger engaging said last mentioned sleeve and adapted to so move it substantially instantly when a predetermined maximum load is reached.

WILLIAM L. McGRATH.